(12) United States Patent
Seo et al.

(10) Patent No.: US 12,418,031 B2
(45) Date of Patent: Sep. 16, 2025

(54) ELECTRODE AND ELECTRODE ASSEMBLY

(71) Applicant: LG Energy Solution, Ltd., Seoul (KR)

(72) Inventors: Sung Won Seo, Daejeon (KR); Hang June Choi, Daejeon (KR); Dal Mo Kang, Daejeon (KR); Jeong Oh Moon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 619 days.

(21) Appl. No.: 17/790,634

(22) PCT Filed: Feb. 4, 2021

(86) PCT No.: PCT/KR2021/001502
§ 371 (c)(1),
(2) Date: Jul. 1, 2022

(87) PCT Pub. No.: WO2021/162346
PCT Pub. Date: Aug. 19, 2021

(65) Prior Publication Data
US 2023/0041411 A1 Feb. 9, 2023

(30) Foreign Application Priority Data
Feb. 10, 2020 (KR) .................... 10-2020-0015833

(51) Int. Cl.
*H01M 4/70* (2006.01)
*H01M 10/0585* (2010.01)
*H01M 50/531* (2021.01)

(52) U.S. Cl.
CPC .......... *H01M 4/70* (2013.01); *H01M 10/0585* (2013.01); *H01M 50/531* (2021.01)

(58) Field of Classification Search
CPC ........... H01M 10/0585; H01M 50/531; H01M 50/533; H01M 4/70
See application file for complete search history.

(56) References Cited

U.S. PATENT DOCUMENTS

2005/0287428 A1 12/2005 Cheon et al.
2011/0293977 A1 12/2011 Kim et al.
(Continued)

FOREIGN PATENT DOCUMENTS

CN 1713437 A 12/2005
CN 102334216 A 1/2012
(Continued)

OTHER PUBLICATIONS

Extended European Search Report including Written Opinion for Application No. 21754256.2 dated Jul. 30, 2024, pp. 1-9.
(Continued)

*Primary Examiner* — Allison Bourke
*Assistant Examiner* — Verita E Grannum
(74) *Attorney, Agent, or Firm* — Lerner David LLP

(57) ABSTRACT

An electrode includes an active material coating portion coated with an electrode active material on at least one surface of an electrode collector; and an active material non-coating portion which is at one side of the active material coating portion, is not coated with the electrode active material, and includes at least one slit extending from one end to another end thereof, wherein in each slit of the at least one slit, a hole passes through a point at which the respective slit and the active material coating portion meet each other.

15 Claims, 14 Drawing Sheets

(56) References Cited

U.S. PATENT DOCUMENTS

| | | | |
|---|---|---|---|
| 2012/0115021 A1 | 5/2012 | Yotsumoto | |
| 2014/0072851 A1 | 3/2014 | Oh et al. | |
| 2017/0025682 A1* | 1/2017 | Ji | H01M 4/70 |
| 2017/0077480 A1 | 3/2017 | Hwang et al. | |
| 2020/0313155 A1* | 10/2020 | Zhang | H01M 4/136 |
| 2020/0321658 A1 | 10/2020 | Fukunaga et al. | |

FOREIGN PATENT DOCUMENTS

| | | | |
|---|---|---|---|
| CN | 103988339 A | 8/2014 |
| JP | H11176447 A | 7/1999 |
| JP | 2001102051 A | 4/2001 |
| JP | 2005044539 A | 2/2005 |
| JP | 2006012827 A | 1/2006 |
| JP | 2006221817 A | 8/2006 |
| JP | 5308425 B2 | 10/2013 |
| JP | 2014022102 A | 2/2014 |
| JP | 2014022116 A | 2/2014 |
| JP | 2014179217 A | 9/2014 |
| JP | 2018147602 A | 9/2018 |
| JP | 2019102361 A | 6/2019 |
| JP | 2019125566 A | 7/2019 |
| KR | 100599749 B1 | 7/2006 |
| KR | 20060102854 A | 9/2006 |
| KR | 20080034222 A | 4/2008 |
| KR | 101147610 B1 | 5/2012 |
| KR | 20140136837 A | 12/2014 |
| KR | 20170010587 A | 2/2017 |
| KR | 20170032031 A | 3/2017 |
| WO | 2017204184 A1 | 11/2017 |

OTHER PUBLICATIONS

Search report from International Application No. PCT/KR2021/001502, mailed May 12, 2021.
Search Report dated Jul. 27, 2023 from the Office Action for Chinese Application No. 202180007492.5 issued Jul. 29, 2023, 9 pages. (see p. 7-8, categorizing the cited references).

* cited by examiner

ELECTRODE AND ELECTRODE ASSEMBLY

CROSS-REFERENCE TO RELATED APPLICATIONS

The present application is a national phase entry under 35 U.S.C. § 371 of International Application No. PCT/KR2021/001502, filed on Feb. 4, 2021, which claims the benefit of the priority of Korean Patent Application No. 10-2020-0015833, filed on Feb. 10, 2020, both of which are hereby incorporated by reference in their entireties.

TECHNICAL FIELD

The present invention relates to an electrode and an electrode assembly, and more particularly, to an electrode, which is prevented from being bent or warped after a rolling process is completed, and an electrode assembly.

BACKGROUND ART

In general, secondary batteries comprise nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In order to manufacture an electrode assembly, a cathode (hereinafter, referred to as a positive electrode), a separator, and an anode (hereinafter, referred to as a negative electrode) are manufactured and stacked.

Specifically, positive electrode active material slurry is applied to a positive electrode collector, and negative electrode active material slurry is applied to a negative electrode collector to manufacture a positive electrode and a negative electrode. Also, when the separator is interposed and stacked between the manufactured positive electrode and the manufactured negative electrode, unit cells are formed. The unit cells are stacked on each other to form an electrode assembly. Also, when the electrode assembly is accommodated in a specific case, and an electrolyte is injected, the secondary battery is manufactured.

A process of manufacturing the secondary battery is largely divided into three steps such as an electrode process, an assembly process, and a formation process. In addition, the electrode process is further divided into an active material mixing process, an electrode coating process, a rolling process, a slitting process, and a winding process. Among them, the rolling process is a process of allowing an electrode sheet to pass between two rolling rolls, which are heated at a high temperature, to compress the electrode sheet to a desired temperature and density in order to increase in capacity density by reducing a thickness of the electrode sheet, on which the coating process of an electrode mixture is completed, and increase in adhesion and attachment between an electrode collector and an electrode active material contained in the electrode mixture.

FIG. 1 is a schematic view of an electrode 100 according to the related art, and FIG. 2 is a schematic view illustrating a state in which the electrode 100 is rolled according to the related art.

As illustrated in FIG. 1, the electrode 100 such as a positive electrode 101 (see FIG. 3) and a negative electrode 102 (see FIG. 3) comprise an active material coating portion 1003 coated with an electrode active material 1002 and an active material non-coating portion 1004 that is not coated with the electrode active material 1002. The active material coating portion 1003 is an area that directly generates electric power and occupies a large area of the electrode 100. In addition, the active material non-coating portion 1004 is directly cut or is connected to a separate conductive member to form an electrode tab 11.

According to the related art, when the electrode sheet passes between the two rolling rolls 2 in the rolling process, as illustrated in FIG. 2, the active material coating portion 1003 is relatively thick to receive more heat and pressure, and the active material non-coating portion 1004 is relatively thin to receive less heat and pressure. Therefore, due to the difference in heat and pressure, there is a problem in that the electrode 100 is bent or warped after the rolling process is completed. Particularly, in recent years, as a cell having a high energy density is required, a loading amount of the electrode active material 1002 increases, and this problem has occurred even more.

DISCLOSURE OF THE INVENTION

Technical Problem

An object of the present invention for solving the above problem is to provide an electrode, which is capable of being prevented from being bent or warped after a rolling process is completed, and an electrode assembly.

The objects of the present invention are not limited to the aforementioned object, but other objects not described herein will be clearly understood by those skilled in the art from descriptions below.

Technical Solution

An electrode according to an embodiment of the present invention for solving the above problem comprises: an active material coating portion coated with an electrode active material on at least one surface of an electrode collector; and an active material non-coating portion which is at one side of the active material coating portion, is not coated with the electrode active material, and comprises at least one slit extending from one end to another end thereof, wherein in each slit of the at least one slit, a hole passes through a point at which the respective slit and the active material coating portion meet each other.

Also, each slit of the at least one slit may have a linear shape.

Also, each slit of the at least one slit may have an inclination with respect to a boundary between the active material non-coating portion and the active material coating portion.

Also, each slit of the at least one slit may have a curved shape.

Also, the curved shape may have a constant curvature.

Also, the curved shape may have a plurality of curvature centers.

Also, each slit of the at least one slit may have a wave shape.

Also, a width from one end to another end of each slit of the at least one slit may be changed regularly or irregularly.

Also, the hole may have at least one of a circular shape, an elliptical shape, or a polygonal shape.

Also, the at least one slit may include a plurality of slits, and one hole may be disposed in one end of each slit of the plurality of slits.

Also, the holes may have shapes different from each other.

In an electrode assembly, in which electrodes and separators are alternately stacked, according to an embodiment of the present invention for solving the above problem, each of the electrodes comprises: an active material coating portion coated with an electrode active material on at least one surface of an electrode collector; and an active material non-coating portion which is at one side of the active material coating portion, is not coated with the electrode active material, and comprises at least one slit extending from one end to another end thereof, wherein in each slit of the at least one slit, a hole passes through a point at which the respective slit and the active material coating portion meet each other.

Also, a slit in a positive electrode of the electrodes and a slit in a negative electrode of the electrodes may have shapes different from each other.

Also, a hole in a positive electrode of the electrodes and a hole in a negative electrode of the electrodes may have shapes different from each other.

Particularities of other embodiments are comprised in the detailed description and drawings.

Advantageous Effects

According to the embodiments of the present invention, there are at least the following effects.

Since the slit is formed in the active material non-coating portion of the electrode, the electrode may be prevented from being bent or warped even after the rolling process is completed.

Particularly, the slit having the suitable shape according to the degree of the warpage of the electrode, which is different for the size and kind of the electrode and the applied heat and pressure, may be formed to more efficiently prevent the electrode from being bent or warped.

In addition, since the hole is formed to pass through the point at which the slit and the active material coating portion meet each other, the stress concentrated to one end of the slit may be dispersed to prevent the cracks from occurring toward the active material coating portion.

Particularly, the hole having the suitable shape according to the distribution of the stress, which cause the cracks that are different for the size and kind of the electrode and the applied heat and pressure, may be formed to more efficiently prevent the cracks from occurring toward the active material coating portion.

The effects of the prevent invention are not limited by the aforementioned description, and thus, more varied effects are involved in this specification.

MODE FOR CARRYING OUT THE INVENTION

Figure 1:
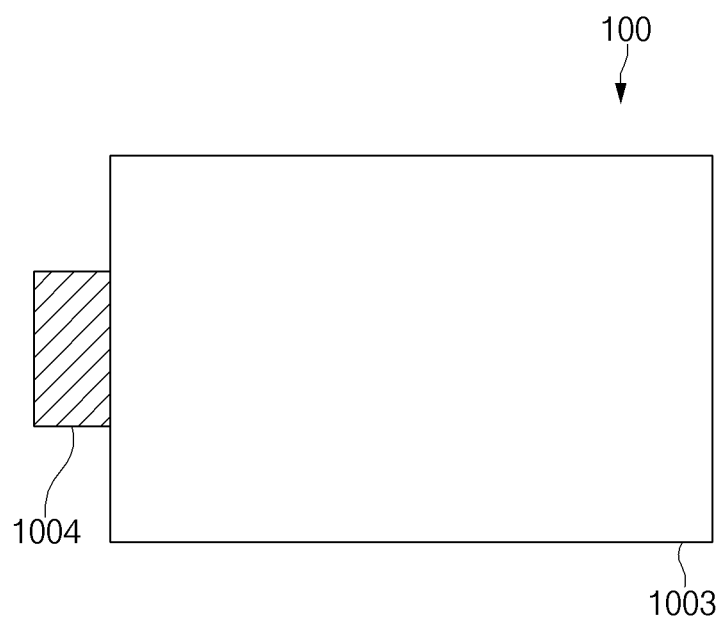
FIG. 1 is a schematic view of an electrode according to a related art.
Figure 2:
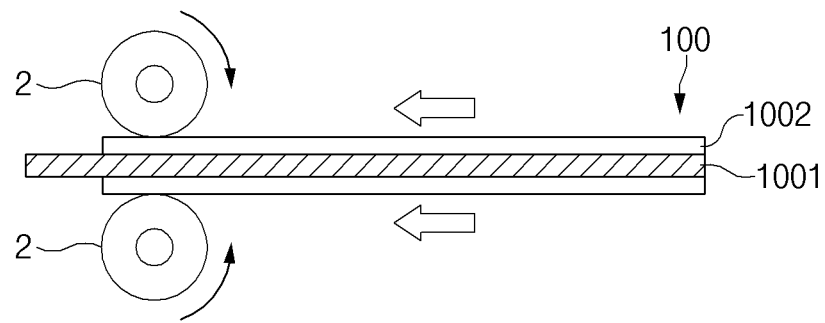
FIG. 2 is a schematic view illustrating a state in which the electrode is rolled according to the related art.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (comprising technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

Figure 3:
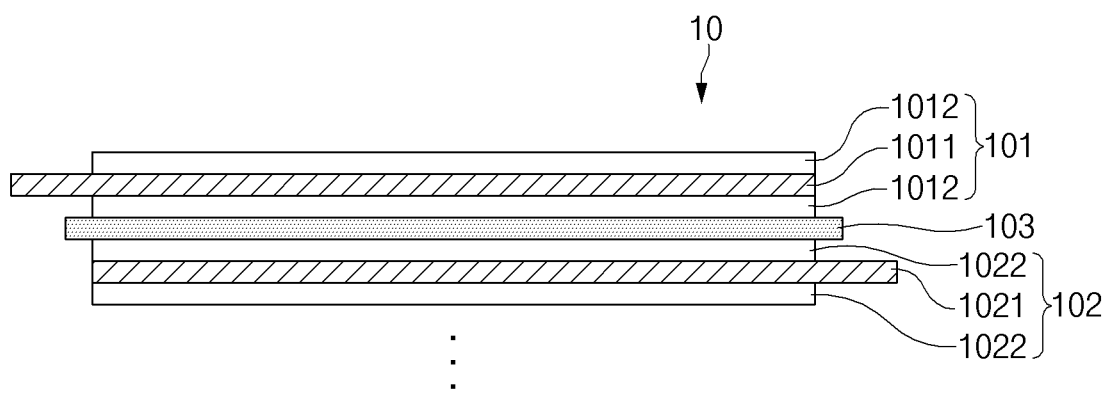
FIG. 3 is a schematic view of an electrode assembly according to a first embodiment of the present invention.

FIG. 3 is a schematic view of an electrode assembly 10 according to a first embodiment of the present invention.

In order to manufacture the electrode assembly 10 according to the first embodiment of the present invention, first, slurry in which a positive electrode active material 1012, a binder, and a plasticizer are mixed is applied to a positive electrode collector 1011 having the form of a metal foil or metal mesh containing aluminum and then is dried and pressed to manufacture a positive electrode 101 (i.e., cathode). In addition, slurry in which a negative electrode active material 1022, a binder, and a plasticizer are mixed is applied to a negative electrode collector 1021 having the form of a metal foil or metal mesh containing copper and then is dried and pressed to manufacture a negative electrode 102 (i.e., anode). The slurry may be usually formed by agitating a granular active material, an auxiliary conductor, a binder, and a plasticizer with a solvent added. At this time, if necessary, the slurry may further comprise a filler. Also, the solvent may be removed in the subsequent process. Each of the positive electrode 101 and the negative electrode 102 may be manufactured in the form of a sheet and then be mounted on a roll.

The electrode assembly 10 is formed by alternately stacking electrodes 100 and separators 103. Particularly, a stacked structure, in which the separator 103 is interposed between the electrodes 100 or disposed at a left or right side of any one electrode 100 so as to insulate the two types of electrodes 100, which are manufactured into the positive electrode 101 and the negative electrode 102, from each other, may be provided. In the stacked structure, the positive electrode 101 and the negative electrode 102, each of which has a predetermined standard, may be stacked with the separator 103 interposed therebetween or may be wound in the form of a jelly-roll. Alternatively, when the separator 103 is interposed between the manufactured positive electrode 101 and the manufactured negative electrode 102 so as to be stacked, unit cells may be formed. Then, the unit cells may be stacked on each other to form the electrode assembly 10 as illustrated in FIG. 3.

The cathode collector 1011 generally has a thickness of 3 μm to 500 μm. The positive electrode collector 1011 is usually made of a material having high conductivity without causing a chemical change. Such a material may be surface-treated with, for example, stainless steel, aluminum, nickel, titanium, calcined carbon, or aluminum or stainless steel on which carbon, nickel, titanium, silver, or the like is surface-treated on a surface thereof, but is not limited thereto. Also, the positive electrode collector 1011 may form a fine unevenness on a surface of the positive electrode collector 1012 to increase in adhesion of the positive electrode active material 1012. Also, the positive electrode collector 1011 may have various shapes such as a film, a sheet, a foil, a net, a porous body, a foam, or a non-woven fabric.

In case of a lithium secondary battery, the positive electrode active material 1012 may comprise, for example, a layered compound of lithium cobalt oxide (LiCoO2), lithium nickel oxide (LiNiO2), etc., or a substituted compound with one or more transition metals; lithium manganese oxide such as Li1+xMn2−xO4 (x is 0 to 0.33), LiMnO3, LiMn2O3, LiMnO2, etc.; lithium copper oxide (Li2CuO2); vanadium oxide such as LiV3O8, LiFe3O4, V2O5, Cu2V2O7, etc.; Ni site-type lithium nickel oxide represented by Chemical Formula of LiNi1−xMxO2 (M=Co, Mn, Al, Cu, Fe, Mg, B or Ga, and x=0.01 to 0.3); lithium manganese complex oxide represented by Chemical Formula LiMn2−xMxO2 (M=Co, Ni, Fe, Cr, Zn or Ta, and x=0.01 to 0.1) or Li2Mn3MO8 (M=Fe, Co, Ni, Cu or Zn); LiMn2O4 in which a portion of Li is substituted with alkaline earth ions; a disulfide compound; Fe2(MoO4)3, and the like. However, this embodiment is not limited thereto.

The conductive agent is generally added at 1% to about 50% by weight based on the total weight of the mixture comprising the cathode active material 1012. The conductive agent is usually made of a material having conductivity without causing a chemical change. The conductive agent may comprise, for example, conductive materials such as: graphite such as natural graphite and artificial graphite; carbon black such as acetylene black, Ketjen black, furnace black, channel black, lamp black, and thermal black; conductive fiber such as carbon fiber and metal fiber; metal powder such as carbon fluorine, aluminum, and nickel powder; conductive whisker such as zinc oxide and potassium titanate; conductive oxide such as titanium oxide; or polyphenylene derivatives.

The binder is a component assisting the bonding of the active material to the conductive material and the bonding to the collector and is commonly added at 1 wt % to 50 wt % based on the total weight of the mixture comprising the cathode active material 1012. Examples of the binder may comprise polyfluoro vinylidene, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated EPDM, styrene butadiene rubber, fluorine rubber, various copolymers, and the like.

The filler is optionally used as a component that inhibits expansion of the positive electrode 101. Also, a general filler may be used if the filler is a fibrous material without causing the chemical change. Examples of the filler may comprise olefin polymers such as polyethylene and polypropylene; and fibrous materials such as glass fibers and carbon fibers.

The anode collector 1021 generally has a thickness of 3 μm to 500 μm. The negative electrode collector 1021 is usually made of a material having conductivity without causing a chemical change. Examples of the material comprise copper, stainless steel, aluminum, nickel, titanium, calcined carbon, copper or stainless steel on which carbon, nickel, titanium, silver, or the like is surface-treated on a surface thereof, or aluminum-cadmium alloys. In addition, the negative electrode collector 1021 may form fine unevenness on the surface of the negative electrode collector 1021 to increase in bonding force of the negative electrode active material 1022. Also, the negative electrode collector 1021 may have various shapes such as a film, a sheet, a foil, a net, a porous body, a foam, or a non-woven fabric.

The negative electrode active material 1022 may comprise, for example, carbon such as non-graphitized carbon, graphite-based carbon, etc.; a metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Al, B, P, Si, elements found in Group 1, Group 2 and Group 3 in a periodic table, halogen; $0 < x \leq 1$; $1 \leq y \leq 3$; $1 \leq z \leq 8$), etc.; a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; a conductive polymer such as polyacetylene, etc.; Li—Co—Ni-based material, and the like.

A generally known polyolefin separator or a composite separator in which an organic or inorganic composite layer is formed on an olefin base material may be used as the separator, which insulates the electrodes 100, between the positive electrode 101 and the negative electrode 102, but is not particularly limited thereto.

According to a first embodiment of the present invention, the electrode assembly 10 having the above structure is accommodated in a battery case 13, and then, an electrolyte is injected to manufacture the secondary battery 1.

Figure 4:
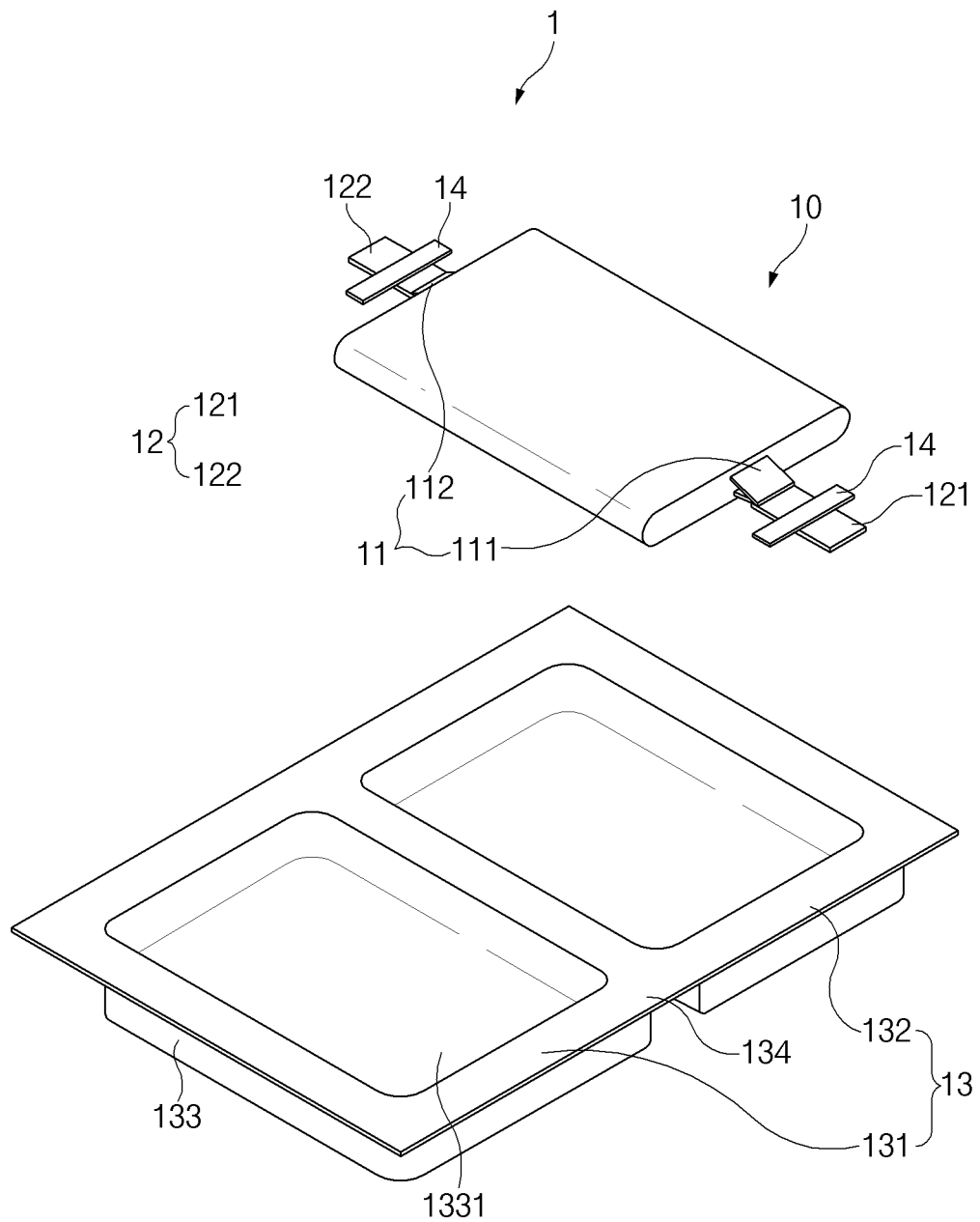
FIG. 4 is an assembly view of a pouch type secondary battery according to the first embodiment of the present invention.

FIG. 4 is an assembly view of the pouch type secondary battery 1 according to the first embodiment of the present invention.

As illustrated in FIG. 4, a pouch type secondary battery 1 according to the first embodiment of the present invention comprises an electrode assembly 10, in which electrodes 100 such as a positive electrode 101 and a negative electrode 102 and a separator 103 are stacked, and a pouch-type battery case 13 accommodating the electrode assembly 10 therein.

In order to manufacture the pouch-type secondary battery 1, the manufactured electrodes 100 are stacked on both sides of the separator 103 to manufacture the electrode assembly 10 having a predetermined shape. Then, the electrode assembly 10 is inserted into the battery case 13, and the battery case 13 is sealed after injecting the electrolyte therein.

As illustrated in FIG. 4, the electrode assembly 10 comprises the electrode tabs 11. The electrode tabs 11 are respectively connected to the positive electrode 101 and the negative electrode 102 of the electrode assembly 10 to protrude to the outside of the electrode assembly 10, thereby providing a path, through which electrons move, between the inside and outside of the electrode assembly 10. An electrode collector 1001 of the electrode assembly 10 comprises an active material coting portion 1003 coated with an electrode active material 1002 and an active material non-coating portion 1004 which is not coated with the electrode active material 1002. Also, an electrode tab 11 may be formed by cutting the non-coating portion or by connecting a separate conductive member to the non-coating portion through ultrasonic welding. As illustrated in FIG. 4, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 that supplies electricity to the outside of the secondary battery 1 is connected to the electrode tab 11 through spot welding. Also, a portion of the electrode lead 12 is surrounded by an insulating part 14. The insulation part 14 may be disposed to be limited within a sealing part 134, at which an upper case 131 and a lower case 132 of the battery case 13 are thermally fused, so that the electrode lead 12 is bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 comprises a positive electrode lead 121 having one end connected to a positive electrode tab 111 to extend in a direction in which the positive electrode tab 111 protrudes and a negative electrode lead 122 having one end connected to a negative electrode tab 112 to extend in a direction in which the negative electrode tab 112 protrudes. On the other hand, as illustrated in FIG. 4, all of the other ends of the positive electrode lead 121 and the negative electrode lead 122 protrude to the outside of the battery case 13. As a result, electricity generated in the electrode assembly 10 may be supplied to the outside. Also, since each of the positive electrode tab 111 and the negative electrode tab 112 is formed to protrude in various directions, each of the positive electrode lead 121 and the negative electrode lead 122 may extend in various directions.

The positive electrode lead 121 and the negative electrode lead 122 may be made of materials different from each other. That is, the positive electrode lead 121 may be made of the same material as the positive electrode collector 1011, i.e., an aluminum (Al) material, and the negative electrode lead 122 may be made of the same material as the negative electrode collector 1021, i.e., a copper (Cu) material or a copper material coated with nickel (Ni). Also, a portion of the electrode lead 12, which protrudes to the outside of the battery case 13, may be provided as a terminal part and electrically connected to an external terminal.

The battery case 13 is a pouch made of a material having flexibility, which accommodates the electrode assembly 10 therein. Hereinafter, the case in which the battery case 13 is the pouch will be described. When a pouch film 135 having flexibility is drawn by using a punch or the like, a portion of the pouch film 135 is stretched to form a cup part 133 comprising a pocket-shaped accommodation space 1331, thereby manufacturing the battery case 13. The battery case 13 accommodates the electrode assembly 10 so that a portion of the electrode lead 12, i.e., the terminal part is exposed and then is sealed. As illustrated in FIG. 4, the battery case 13 comprises the upper case 131 and the lower case 132. An accommodation space 1331 in which a cup part 133 is formed to accommodate the electrode assembly 10 may be provided in the lower case 132, and upper case 131 may cover an upper side of the accommodation space 1331 so that the electrode assembly 10 is not separated to the outside of the battery case 13. Also, the sealing part 134 is sealed to seal the accommodation space 1331. Here, the cup part 133 having the accommodation space 1331 may be formed in the upper case 131 to accommodate the electrode assembly 10 in the upper portion. As illustrated in FIG. 4, one side of the upper case 131 and one side of the lower case 132 may be connected to each other. However, the present invention is not limited thereto. For example, the upper case 131 and the lower case 132 may be separately manufactured to be separated from each other.

When an electrode lead 12 is connected to the electrode tab 11 of the electrode assembly 10, and the insulation part 14 is provided on a portion of the electrode lead 12, the electrode assembly 10 may be accommodated in the accommodation space 1331 provided in the cup part 133 of the lower case 132, and the upper case 131 may cover the accommodation space from the upper side. Also, the electrolyte is injected, and the sealing part 134 extending outward from edges of the upper case 131 and the lower case 132 is sealed. The electrolyte may move lithium ions generated by electrochemical reaction of the electrode 100 during charging and discharging of the secondary battery 1. The electrolyte may comprise a non-aqueous organic electrolyte that is a mixture of a lithium salt and a high-purity organic solvent or a polymer using a polymer electrolyte. The pouch type secondary battery 1 may be manufactured through the above-described method.

Figure 5:
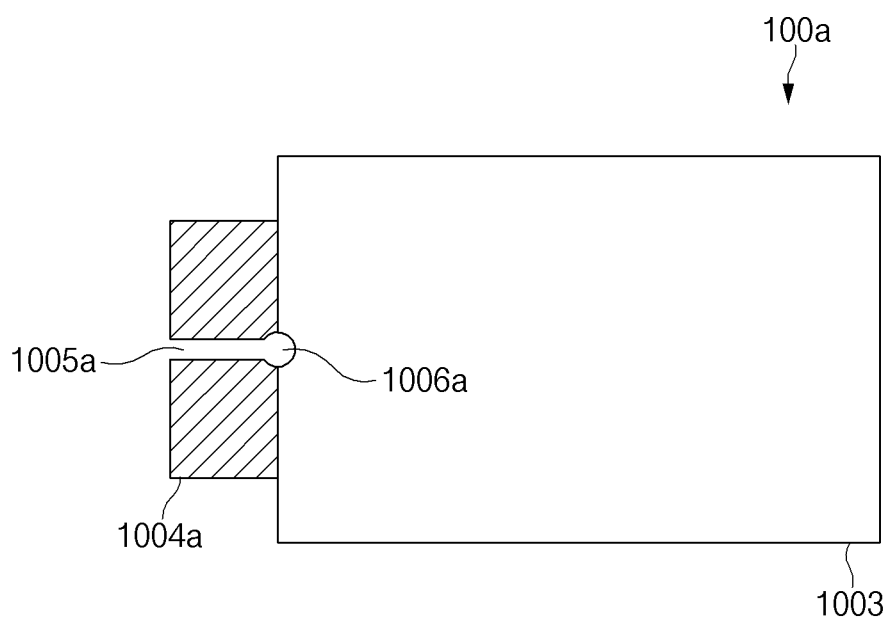
FIG. 5 is a schematic view of an electrode according to the first embodiment of the present invention.

FIG. 5 is a schematic view of an electrode 100a according to the first embodiment of the present invention.

According to embodiments of the present invention, since a slit 1005a-f is formed in the active material non-coating portion 1004a-j of the electrode 100a-j, the electrode 100a-j may be prevented from being bent or warped even after a rolling process is completed. Particularly, the slit 1005a-f having the suitable shape according to a degree of the warpage of the electrode 100a-j, which is different for a size and kind of the electrode 100a-j and an applied heat and pressure, may be formed to more efficiently prevent the electrode 100a-j from being bent or warped. In addition, since a hole is formed to pass through a point at which the slit 1005a-f and the active material coating portion 1003 meet each other, the stress concentrated to one end of the slit 1005a-f may be dispersed to prevent cracks from occurring toward the active material coating portion 1003. Particularly, a hole 1006a-f having a suitable shape according to distribution of stress, which cause the cracks that are different for the size and kind of the electrode 100a-j and the applied heat and pressure, may be formed to more efficiently prevent the cracks from occurring toward the active material coating portion 1003.

For this, the electrode 100a according to the first embodiment of the present invention comprises: an active material coating portion 1003 coated with an electrode active material 1002 on at least one surface of an electrode collector 1001; and an active material non-coating portion 1004a which is formed at one side of the active material coating portion 1003, is not coated with the electrode active material 1002, and comprises at least one slit 1005a extending from one end to the other end thereof. Here, a hole 1006a is formed to pass through a point at which the slit 1005a and the active material coating portion 1003 meet each other.

As illustrated in FIG. 5, the electrode 100a comprises the active material coating portion 1003, on which the electrode active material 1002 is applied on at least one surface of the electrode collector 1001, and the active material non-coating portion 1004a, on which the electrode active material 1002 is not applied.

The active material coating portion 1003 generates electricity by allowing ions to be injected and discharged through the electrolyte. Also, the active material non-coating portion 1004a, i.e., the non-coating portion is formed at one side of the active material coating portion 1003, as described above, and is a distal end on which the electrode active material 1002 is not applied. In addition, an electrode tab 11 may be formed by cutting the non-coating portion or connecting a separate conductive member to the non-coating portion by ultrasonic welding or the like.

According to the first embodiment of the present invention, the active material non-coating portion 1004a comprises one slit 1005a extending from one end to the other end thereof. Thus, after the rolling process is completed, even if stretching amounts of the active material coated portion 1003 and the active material non-coating portion 1004a are different from each other due to a difference in heat and pressure, the slit 1005a may divide the active material non-coating portion 1004a into two areas to prevent the electrode 100a from being bent or warped.

As illustrated in FIG. 5, one end of the active material non-coating portion 1004a is adjacent to the active material coating portion 1003, and the other end of the active material non-coating portion 1004a faces an opposite side of the active material coating portion 1003. In addition, the slit 1005a may extend outward from a boundary between the active material non-coating portion 1004a and the active material coating portion 1003. That is, it is preferable that one end of the slit 1005a is formed at a boundary between the active material non-coating portion 1004a and the active material coating portion 1003. If the slit 1005a does not reach the boundary of the active material coating portion 1003, an area in which the slit 1005a is not formed occurs in the active material coating portion 1003, and this area is because there is a problem of being bent or warped even after the rolling process is completed.

Also, the slit 1005a is formed in only the active material non-coating portion 1004a, and it is preferable that the slit 1005a does not extend to the active material coating portion 1003. The active material coating portion 1003 receives heat and a pressure having a certain intensity because the area of the active material coating portion 1003 on the electrode 100a is relatively large, and a thickness of the active material coating portion 1003 in the electrode 100a is relatively thick. Thus, after the rolling process is completed, the problem that the active material coating portion 1003 is bent or warped does not occur. However, if the slit 1005a extends up to the active material coating portion 1003, an effect of the present invention may not be greatly exhibited, and an energy density may also be reduced by reducing the area of the active material coating portion 1003.

If the width of the slit 1005a is excessively narrowed, the electrode 100a may still be bent or warped even after the rolling process. On the other hand, if the width of the slit 1005a is excessively widened, a cross-sectional area of the electrode tab 11 may decrease, and thus, resistance may increase. Thus, it is preferable to set the width of the slit 1005a, which is most suitable experimentally according to the size and type of the electrode 100a, and the temperature and pressure of the electrode 100a to be rolled.

When the rolling process is performed on the active material coating portion 1003, the stress may not be concentrated because the other end of the slit 1005a faces the outside, but the stress may be concentrated at one end of the slit 1005a to cause cracks toward the active material coating portion 1003. Thus, according to the first embodiment of the present invention, a hole 1006a is formed to pass through a point at which the slit 1005a and the active material coating portion 1003 meets each other. The hole 1006a may disperse the stress concentrated to one end of the slit 1005a to prevent the problem that the cracks occur toward the active material coating portion 1003 by the slit 1005a even after the rolling process is completed.

If the size of the hole 1006a is also excessively narrowed, the cracks may still occur toward the active material coating portion 1003 after the rolling process. On the other hand, if the size of the hole 1006a is excessively widened, the energy density may also be reduced by reducing the area of the active material coating portion 1003.

Figure 6:
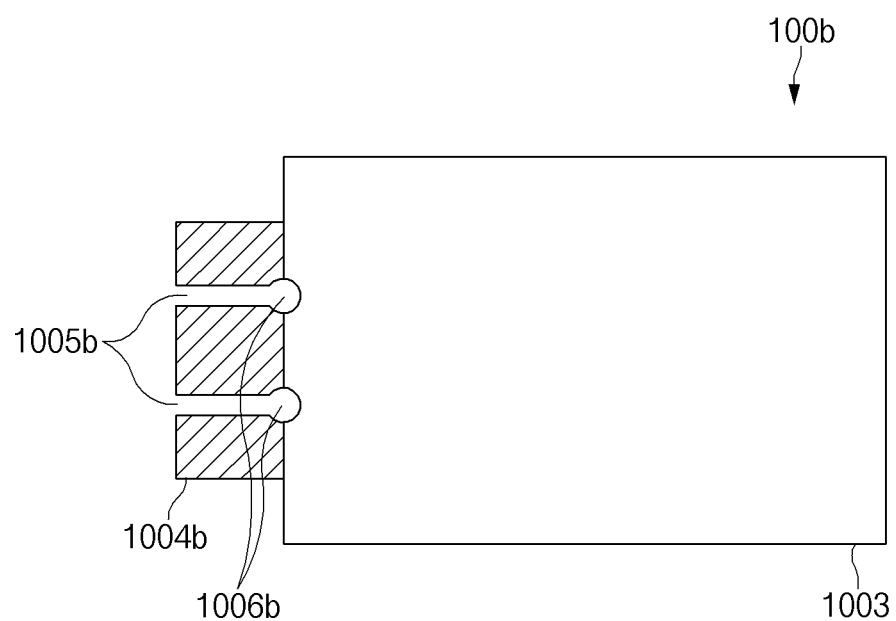
FIG. 6 is a schematic view of an electrode according to a second embodiment of the present invention.

FIG. 6 is a schematic view of an electrode according to a second embodiment of the present invention.

According to the first embodiment of the present invention, the active material non-coating portion 1004a comprises one slit 1005a extending from one end to the other end thereof. In addition, one hole 1006a is formed at one end of one slit 1005a.

However, according to a second embodiment of the present invention, as illustrated in FIG. 6, an active material non-coating portion 1004b comprises a plurality of slits 1005b extending from one end to the other end thereof. In addition, one hole 1006b is formed at one end of each of the plurality of slits 1005b. Thus, the slits 1005b divide the active material non-coating portion 1004b into three (or more in other embodiments) areas to more efficiently prevent an electrode 100b from being bent or warped.

Figure 7:
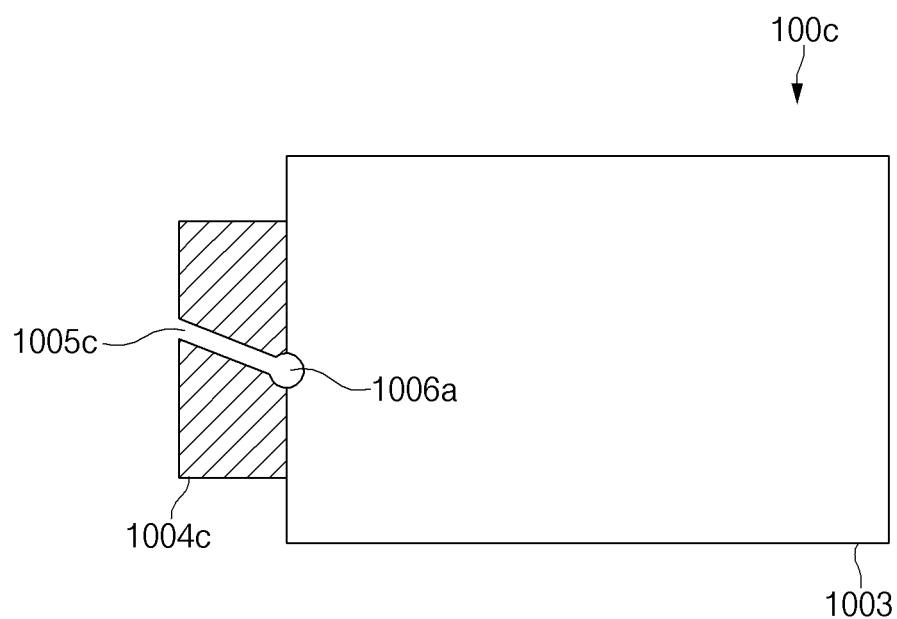
FIG. 7 is a schematic view of an electrode according to a third embodiment of the present invention.
Figure 8:
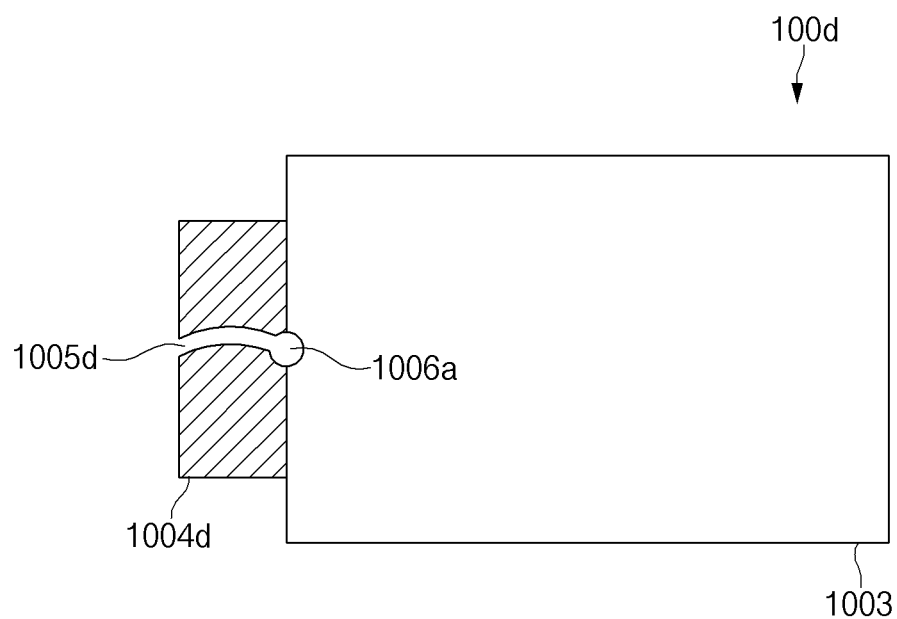
FIG. 8 is a schematic view of an electrode according to a fourth embodiment of the present invention.
Figure 9:
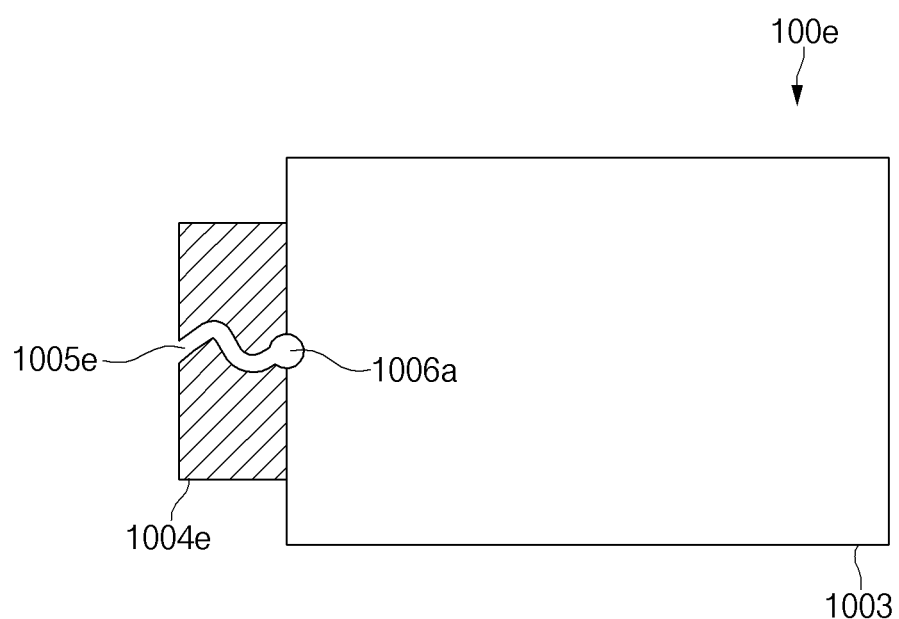
FIG. 9 is a schematic view of an electrode according to a fifth embodiment of the present invention.
Figure 10:
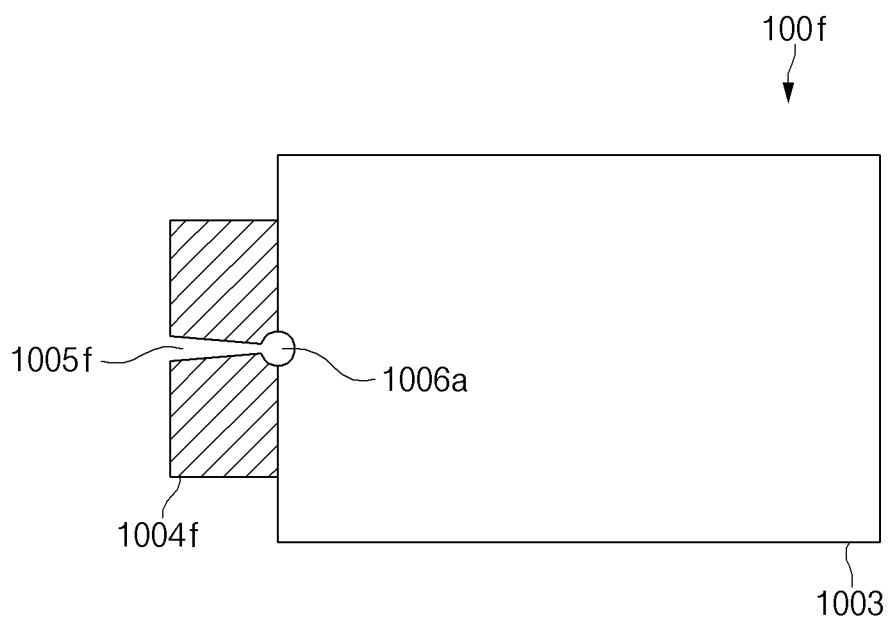
FIG. 10 is a schematic view of an electrode according to a sixth embodiment of the present invention.

FIG. 7 is a schematic view of an electrode 100c according to a third embodiment of the present invention, FIG. 8 is a schematic view of an electrode 100d according to a fourth embodiment of the present invention, FIG. 9 is a schematic view of an electrode 100e according to a fifth embodiment of the present invention, and FIG. 10 is a schematic view of an electrode 100f according to a sixth embodiment of the present invention.

According to the first and second embodiments of the present invention, each of the slits 1005a and 1005b has a linear shape. In addition, each of the slits 1005a and 1005b may extend outward in a direction perpendicular to a boundary between each of the active material non-coating portions 1004a and 1004b and the active material coating portion 1003. Thus, each of all areas on which the active material non-coating portions 1004a and 1004b are divided may have a rectangular shape.

However, a size and type of the electrode 100 may be various, and heat and pressure applied according to the rolling process may also be various. Thus, it may be inefficient to always form only the slit 1005*a, b* having the same shape.

According to other embodiments of the present invention, the shape of the slit 1005*c-f* may be various. Particularly, according to the third embodiment of the present invention, as illustrated in FIG. 7, a slit 1005*c* may have an inclination with respect to a boundary between the active material non-coating portion 1004*c* and the active material coating portion 1003. Thus, the area on which the active material non-coating portion 1004*c* is divided may not have a rectangular shape, but may have a trapezoidal shape or a triangular shape.

Alternatively, according to the fourth embodiment of the present invention, as illustrated in FIG. 8, a slit 1005*d* may have a curved shape, in particular, may have a curved shape having one curvature center. In this case, the curvature may always be constant, but the curvature may be changed regularly or irregularly. Thus, the slit 1005*d* may have various shapes such as an arc shape and an elliptical arc shape.

Alternatively, according to the fifth embodiment of the present invention, as illustrated in FIG. 9, a slit 1005*e* may have a curved shape, in particular, may have a curved shape having a plurality of curvature centers. Here, the plurality of curvature centers may be alternately disposed at left and right sides of the slit 1005*e* at regular intervals, and thus, the slit 1005*e* may have a wave shape. Also, the curves formed for each of the curvature centers may all have the same curvature. Alternatively, the curves may have different curvatures. That is, the plurality of curvature centers are not limited and may be variously disposed, and the curvature of the curve formed for each curvature center may be formed variously.

Alternatively, according to the sixth embodiment of the present invention, as illustrated in FIG. 10, a width of the slit 1005*f* may be changed regularly or irregularly. For example, the width may be uniformly widened from one end to the other end of the slit 1005*f*, and conversely, the width may be uniformly narrowed. Alternatively, a phenomenon in which the width is widened and narrowed at regular intervals may be repeated. That is, the width of the slit 1005*f* is not limited and may be formed variously.

As described above, a degree of warpage of the electrode 100*a-j* is different for a size and kind of the electrode 100*a-j* and an applied heat and pressure, and thus, the slit 1005*a-f* having a suitable shape according to the degree of the warpage of the electrode 100*a-j* may be formed to more efficiently prevent the electrode 100*a-j* from being bent or warped.

Also, a plurality of slits 1005*a-f* having various shapes may be formed in the active material non-coating portion 1004*a-j*. In addition, one hole 1006*a-f* may be formed at one end of each of the plurality of slits 1005*a-f*.

Furthermore, even in one electrode assembly 10, the positive electrode 101 and the negative electrode 102 are different in size and material from each other. Thus, the slit 1005*a-f* formed in the positive electrode 101 and the slit 1005*a-f* formed in the negative electrode 102 may have different shapes from each other.

Figure 11:
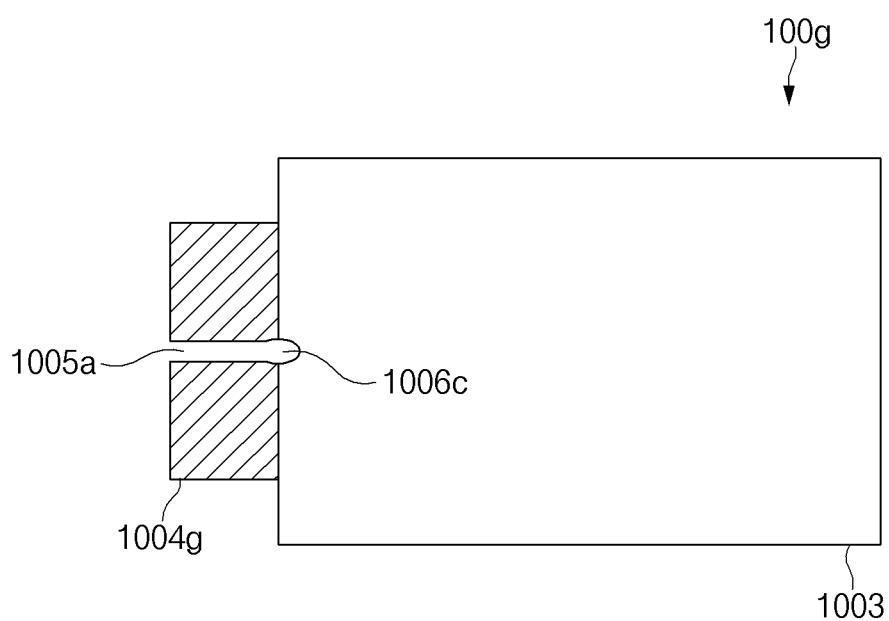
FIG. 11 is a schematic view of an electrode according to a seventh embodiment of the present invention.
Figure 12:
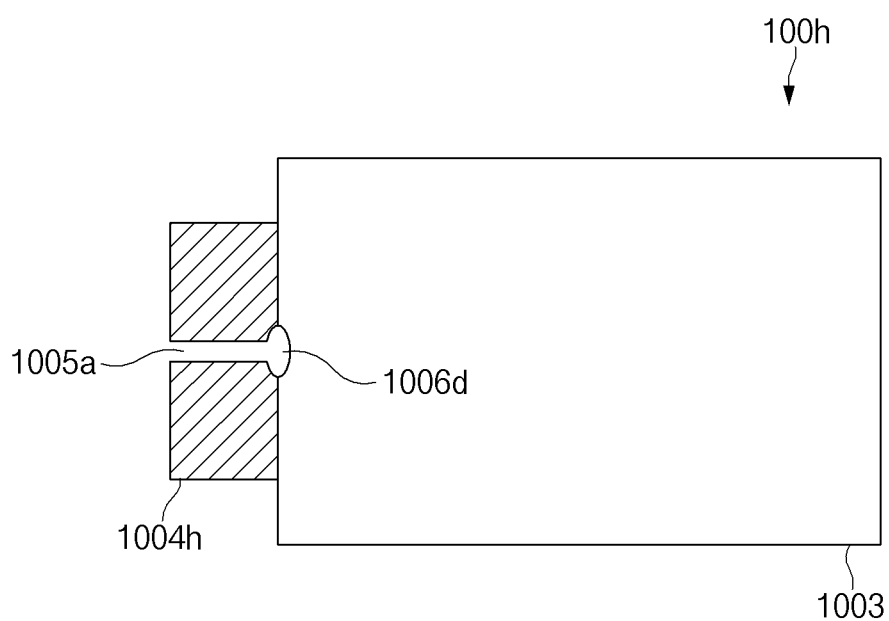
FIG. 12 is a schematic view of an electrode according to an eighth embodiment of the present invention.
Figure 13:
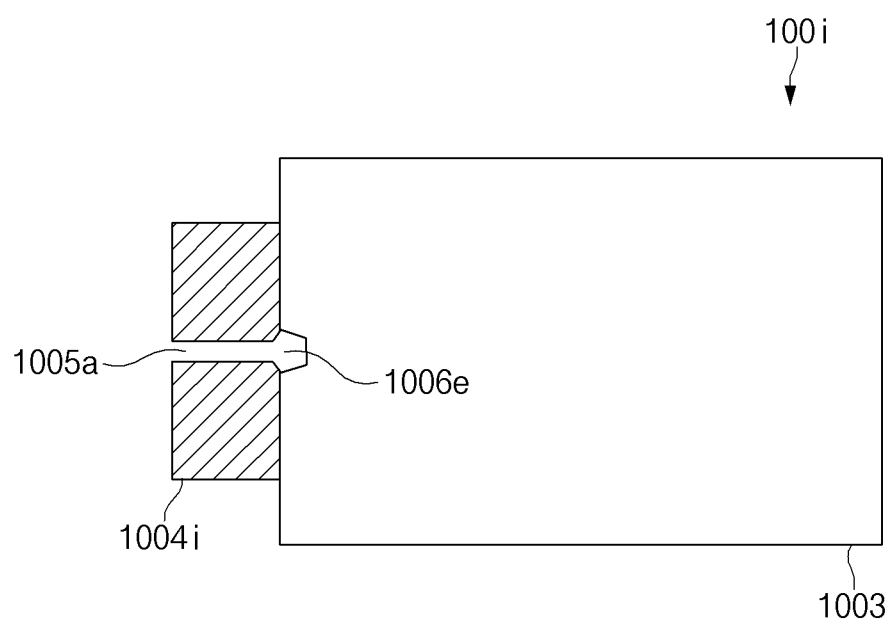
FIG. 13 is a schematic view of an electrode according to a ninth embodiment of the present invention.
Figure 14:
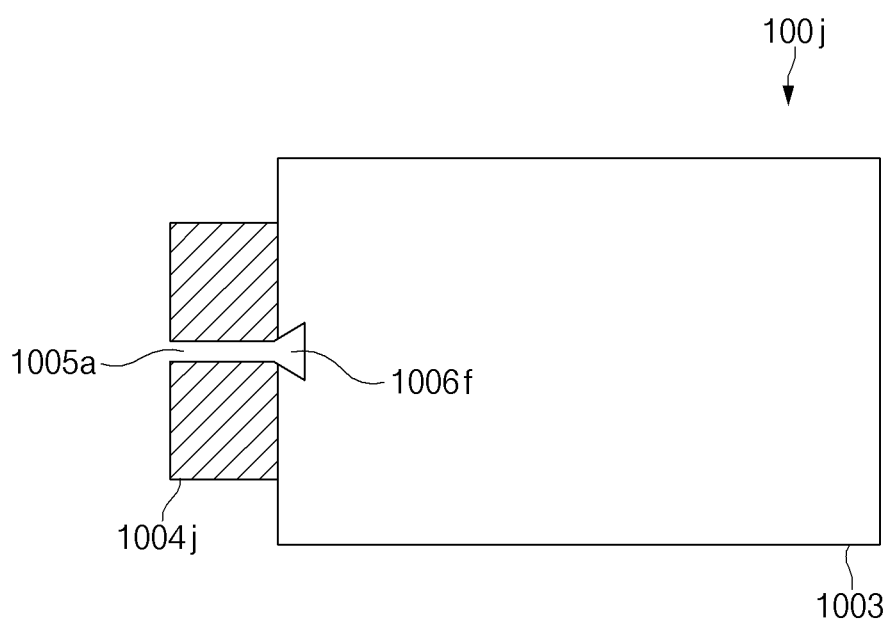
FIG. 14 is a schematic view of an electrode according to a tenth embodiment of the present invention.

FIG. 11 is a schematic view of an electrode 100*g* according to a seventh embodiment of the present invention, FIG. 12 is a schematic view of an electrode 100*h* according to an eighth embodiment of the present invention, FIG. 13 is a schematic view of an electrode 100*i* according to a ninth embodiment of the present invention, and FIG. 14 is a schematic view of an electrode 100*j* according to a tenth embodiment of the present invention.

According to the first to sixth embodiments of the present invention, the hole 1006*a* has a circular shape. However, a size and type of the electrode 100*a-j* may be various, and heat and pressure applied according to the rolling process may also be various. Thus, it may be inefficient to always form only the hole 1006*a* having the circular shape.

For example, if the hole 1006*a* has the circular shape, stress may be uniformly dispersed, but durability of peripheral areas of the hole 1006*a-f* may be different according to the types of electrode 100*a-j*. That is, there may be an area in which the durability is strong, and thus, cracks are not easily generated even under large stress, whereas there may be an area in which the durability is weak, and thus, cracks are easily generated even under small stress.

According to other embodiments of the present invention, the shape of the hole 1006*a-f* may be various. For example, the hole 1006*a-f* may have at least one shape of a circular, elliptical, or polygonal shape. Particularly, each of the holes 1006*c* and 1006*d* may have an elliptical shape, and according to the seventh embodiment of the present invention, as illustrated in FIG. 11, the hole 1006*c* has a long axis having an elliptical shape, which is formed parallel to the slit 1005*a*. Alternatively, according to the eighth embodiment of the present invention, as illustrated in FIG. 12, the hole 1006*d* may have a short axis having the elliptical shape, which is formed parallel to the slit 1005*a*.

In the elliptical-shaped holes 1006*c* and 1006*d*, the stress is widely dispersed to a corner having a small curvature, and the stress is narrowly dispersed to a corner having a large curvature. Thus, each of the holes 1006*c* and 1006*d* may be formed so that the corner having the small curvature faces an area having relatively strong durability, and the corner having the large curvature faces an area having relatively weak durability.

Alternatively, the hole 1006*e-f* may have a polygonal shape, and according to the ninth embodiment of the present invention, as illustrated in FIG. 13, the hole 1006*e* may be formed in a pentagonal shape. Alternatively, according to the tenth embodiment of the present invention, as illustrated in FIG. 14, the hole 1006*f* may be formed in a triangular shape.

In the polygonal-shaped holes 1006*e* and 1006*f*, the stress is widely dispersed to a corner of a straight line, and the stress is narrowly dispersed to a vertex. Thus, each of the holes 1006*c* and 1006*d* may be formed so that the vertex faces an area having relatively strong durability, and the corner of the straight line faces an area having relatively weak durability.

As described above, distribution of the stress that causes the cracks may be different for the size and kind of the electrode 100*a-j* and the applied heat and pressure, and thus, the hole 1006*a-f* having a suitable shape according to the distribution of the stress may be formed to more efficiently prevent the cracks from occurring toward the active material coating portion 1003.

In addition, a plurality of slits 1005*a-f* may be formed in the active material non-coating portion 1004. Here, one hole 1006*a-f* having various shapes may be formed at one end of each of the plurality of slits 1005*a-f*, and the holes 1006*a-f* may have shapes different from each other.

Furthermore, even in one electrode assembly 10, the positive electrode 101 and the negative electrode 102 are different in size and material from each other. Thus, the hole 1006*a-f* formed in the positive electrode 101 and the hole 1006*a-f* formed in the negative electrode 102 may have different shapes from each other.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

| [Description of the Symbols] | |
|---|---|
| 1: | Secondary battery |
| 10: | Electrode assembly |
| 11: | Electrode tab |
| 12: | Electrode lead |
| 13: | Battery case |
| 14: | Insulation part |
| 100a-j: | Electrode |
| 101: | Positive electrode |
| 102: | Negative electrode |
| 103: | Separator |
| 111: | Positive electrode tab |
| 112: | Negative electrode tab |
| 121: | Positive electrode lead |
| 122: | Negative electrode lead |
| 131: | Upper case |
| 132: | Lower case |
| 133: | Cup part |
| 134: | Sealing part |
| 1001: | Electrode collector |
| 1002: | Electrode active material |
| 1003: | Active material coating portion |
| 1004a-j: | Active material non-coating portion |
| 1005a-f: | Slit |
| 1006a-f: | Hole |
| 1011: | Positive electrode collector |
| 1012: | Positive electrode active material |
| 1021: | Positive electrode collector |
| 1022: | Positive electrode active material |
| 1331: | Accommodation space |

The invention claimed is:

1. An electrode comprising:
an active material coating portion coated with an electrode active material on at least one surface of an electrode collector; and
an active material non-coating portion which is at one side of the active material coating portion, is not coated with the electrode active material, and comprises at least one slit extending from one end to another end thereof,
wherein in each slit of the at least one slit, a hole passes through a point at which the respective slit, the active material non-coating portion, and the active material coating portion meet each other.

2. The electrode of claim 1, wherein each slit of the at least one slit has a linear shape.

3. The electrode of claim 2, wherein each slit of the at least one slit has an inclination with respect to a boundary between the active material non-coating portion and the active material coating portion.

4. The electrode of claim 1, wherein each slit of the at least one slit has a curved shape.

5. The electrode of claim 4, wherein the curved shape has a constant curvature.

6. The electrode of claim 4, wherein the curved shape has a plurality of curvature centers.

7. The electrode of claim 6, wherein each slit of the at least one slit has a wave shape.

8. The electrode of claim 1, wherein a width from one end to another end of each slit of the at least one slit is changed regularly.

9. The electrode of claim 1, wherein the hole has at least one of a circular shape, an elliptical shape, or a polygonal shape.

10. The electrode of claim 1, wherein the at least one slit includes a plurality of slits, and one hole is disposed in one end of each slit of the plurality of slits.

11. The electrode of claim 10, wherein the holes have shapes different from each other.

12. An electrode assembly, in which electrodes and separators are alternately stacked,
wherein each of the electrodes is an electrode according to claim 1.

13. The electrode assembly of claim 12, wherein a slit in a positive electrode of the electrodes and a slit in a negative electrode of the electrodes have shapes different from each other.

14. The electrode assembly of claim 12, wherein a hole in a positive electrode of the electrodes and a hole in a negative electrode of the electrodes have shapes different from each other.

15. The electrode of claim 1, wherein a width from one end to another end of each slit of the at least one slit is changed irregularly.

* * * * *